Figure 1:
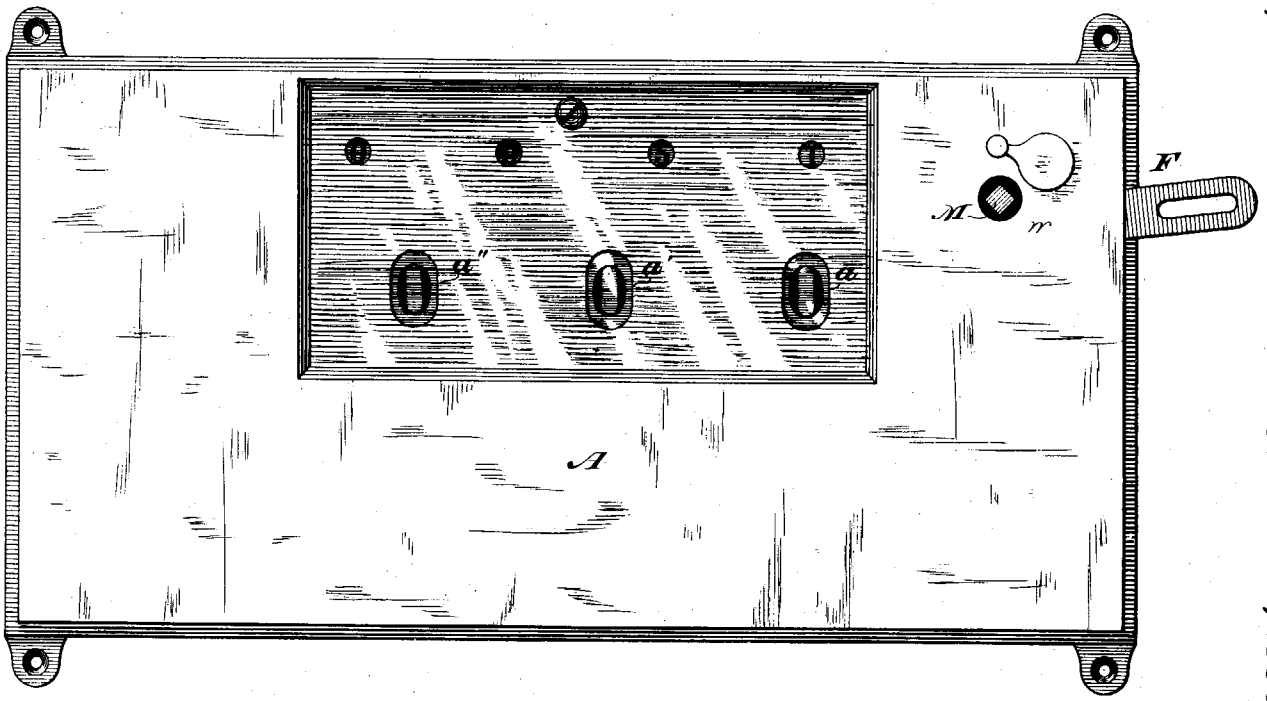

4 Sheets—Sheet 1.

J. BENNOR & P. POND,

Assignor, by mesne assignments, to RAILWAY REGISTER MANUFACTURING Co.

Registering Apparatus.

No. 9,118. Reissued Mar. 16, 1880.

WITNESSES

Wm A Skinkle

Geo W Beck

By their Attorneys

INVENTORS

Joseph Bennor,

Philander Pond.

Baldwin, Hopkins & Peyton

4 Sheets—Sheet 2.

J. BENNOR & P. POND,

Assignor, by mesne assignments, to RAILWAY REGISTER MANUFACTURING CO.

Registering Apparatus.

No. 9,118. Reissued Mar. 16, 1880.

*WITNESSES*

Wm. A. Skinkle.

Geo. W. Buck.

*INVENTORS*

Joseph Bennor,

Philander Pond,

*By their Attorneys*

Baldwin, Hopkins & Peyton.

J. BENNOR & P. POND,

Assignor, by mesne assignments, to RAILWAY REGISTER MANUFACTURING CO.

Registering Apparatus.

No. 9,118. Reissued Mar. 16, 1880.

WITNESSES

Wm. A. Skinkle

Geo. N. Buck

By their Attorneys

INVENTORS

Joseph Bennor,

Philander Pond,

Baldwin, Hopkins & Peyton.

J. BENNOR & P. POND,

Assignor, by mesne assignments, to RAILWAY REGISTER MANUFACTURING CO.

Registering Apparatus.

No. 9,118. Reissued Mar. 16, 1880.

*WITNESSES*

Wm A. Skinkle.

Geo W. Buck.

*By their Attorneys*

*INVENTORS*

Joseph Bennor,

Philander Pond,

Baldwin, Hopkins & Peyton.

UNITED STATES PATENT OFFICE.

JOSEPH BENNOR AND PHILANDER POND, OF PHILADELPHIA, PENNSYLVANIA, ASSIGNORS, BY MESNE ASSIGNMENTS, TO RAILWAY REGISTER MANUFACTURING COMPANY, OF BUFFALO, NEW YORK.

REGISTERING APPARATUS.

SPECIFICATION forming part of Reissued Letters Patent No. 9,118, dated March 16, 1880.

Original No. 200,642, dated February 26, 1878. Application for reissue filed January 24, 1880.

*To all whom it may concern:*

Be it known that we, JOSEPH BENNOR and PHILANDER POND, both of the city and county of Philadelphia, in the State of Pennsylvania, have invented certain new and useful Improvements in Adding and Recording Machines, of which the following is a specification.

Our invention relates more especially to recording, counting, or registering machines having two sets of registering devices, one set of which devices is for the purpose of making a permanent register, tally, or count, while the other set of said registering devices is for the purpose of consecutively registering, counting, or tallying temporarily, or for a short time only.

Such duplex registering-machines, as they existed prior to the date of our invention, when operated, showed a simultaneous actuation of both the permanent and temporary registers, the permanent register retaining the count, tally, or record made by it, while the temporary register was capable of being reset to zero or the starting-point without destroying or affecting the integrity of the record made by the permanent register.

In order to provide what we regard as a simpler, better, more durable, and safer duplex registering-machine than those in common use, we have devised a registering-machine having a permanent and a temporary registering mechanism which works upon a new principle, and this essential principle of our register, broadly stated, is that, when actuated by the prime mover in the process of counting or tallying, but one of the registering mechanisms is operated consecutively—to wit, the temporary register—while the permanent registering mechanism remains unacted upon during the said counting actuations, but receives, when the temporary register is being reset to turn it to zero or the starting-point to commence its registering or counting operations anew, a consecutive transfer of the record of said temporary register.

Each independent resetting movement of the temporary register, after having been actuated in the process of counting, is accompanied by a transfer of its record to the permanent register, and said latter register consequently shows for each of said resetting movements an increase in the tally, count, or record preserved by it. We will therefore state our present invention to consist of the combination of two sets of registering mechanisms—to wit, a temporary registering mechanism and a permanent registering mechanism—one only of which (the temporary register) is actuated by the prime mover or handle of the machine in the process of counting, and is capable of being reset or turned to its starting-point, while the other (the permanent set of said registering mechanism) receives a transfer of the record of the adjustable register during the resetting movement of said register, whereby a permanent record of the count or tally is preserved.

Our present invention also consists of certain other new combinations of devices, which are set out at the close of this specification.

Having thus explained the principle of our invention, we will now describe the best way known to us of embodying our said invention previous to the date of filing the application for the original patent, reference being had to the accompanying drawings, in which—

Figure 2:
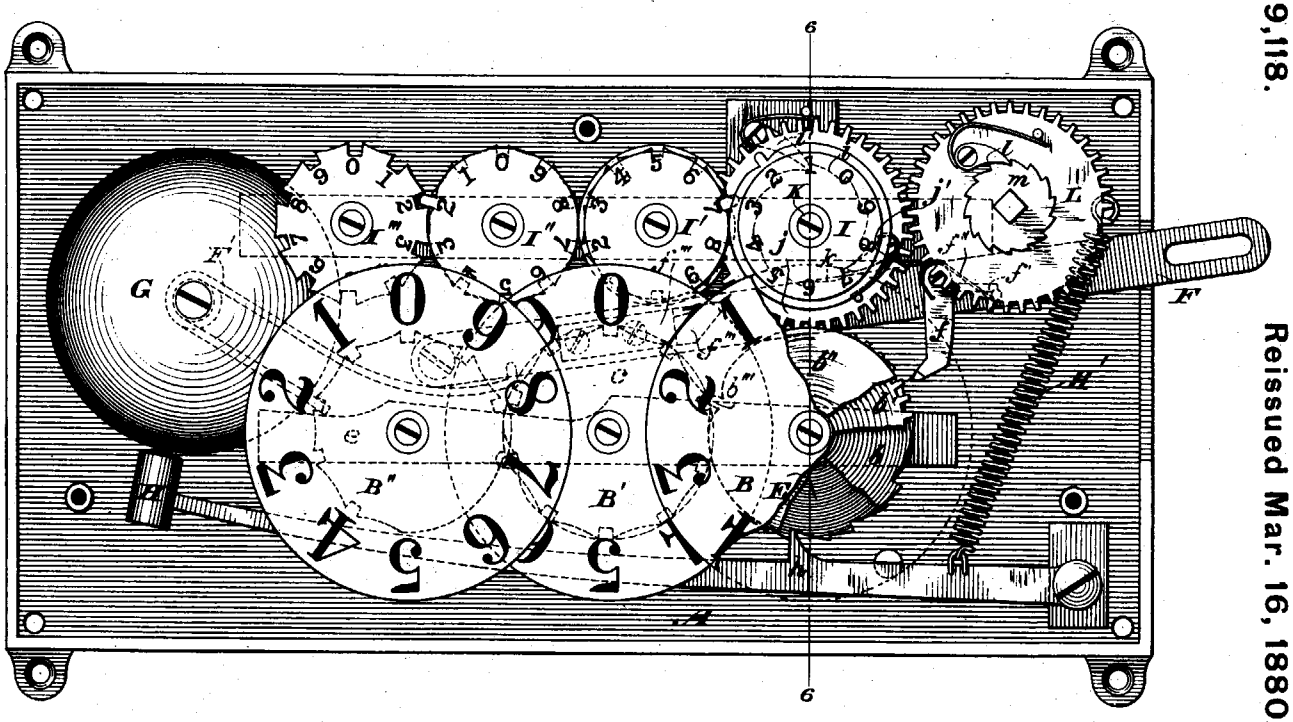
Figure 3:
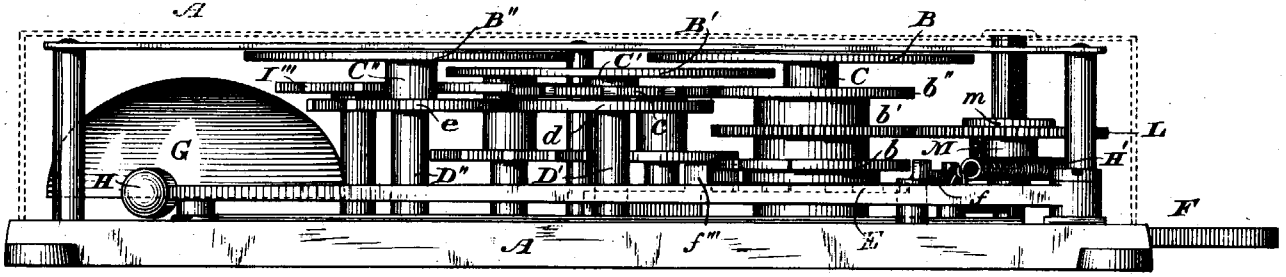
Figure 4:
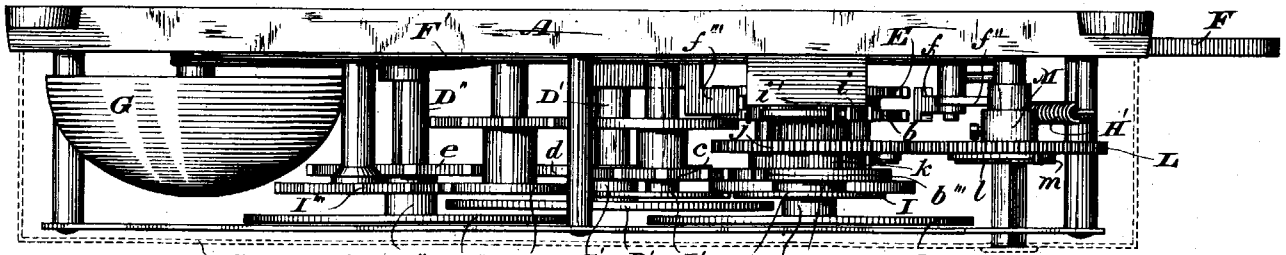
Figure 5:
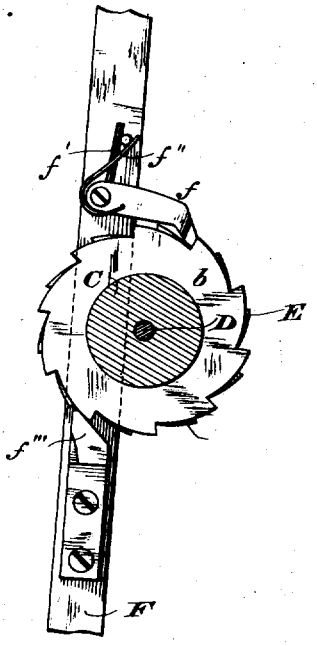
Figure 6:
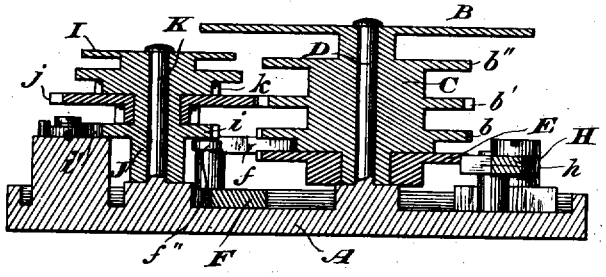

Figure 1 is a face view or front elevation of a register embodying our improvements, and Fig. 2 is a similar view thereof with the cover or face-plate and dial of the casing removed to show the interior or working parts of the apparatus. Fig. 3 is an edge view of the apparatus, looking from the temporary-register side of the machine, and Fig. 4 is a similar view, looking from the permanent or receiving-register side of the apparatus. Fig. 5 is a view of a portion of the actuator, prime mover, or handle of the machine, together with the actuating-wheel of the temporary register detached, to show more clearly the construction and operation of those parts of the machine; and Fig. 6 is a transverse sectional view through the machine, taken on the line 6 6 of Fig. 2.

The casing A of the register is shown as of an oblong rectangular shape, which is considered to be the best shape for the reception of the mechanism as organized in the present instance. The casing is shown as provided with suitable ears or lugs having holes therein, by which the register may be fixed in place to a permanent support, if desired.

The registering mechanism consists of two sets, to wit, a temporary or transfer registering mechanism which is capable of being reset to the starting-point or zero at will and a permanent or receiving registering mechanism which preserves a continuous count or tally, and which is incapable of being reset at will to the starting-point, a transfer of the count or tally made by the said temporary register being made to the permanent register at each resetting movement of said temporary or transfer register.

The temporary registering mechanism (which we will hereinafter designate as the "temporary resister") consists of three wheels or disks, B B′ B″, in the example shown—that is, of a units-wheel, a tens-wheel, and a hundreds-wheel, for registering, respectively, units, tens, and hundreds, the units-wheel at every complete revolution turning the tens-wheel one tenth of a revolution, while the tens-wheel in turn, at every complete revolution, turns the hundreds-wheel one-tenth of a revolution—a method of arranging and operating a train of registering-wheels which is well known.

We prefer the registering-wheels both of the temporary and permanent registers (the latter of which will be hereinafter fully described) to be constructed and operate on the principle of the well-known "Geneva stop" wheel, and a description of such a wheel as we employ in the temporary register will be sufficient for an understanding of the permanent-register train, except as to the construction of the units-wheel of said permanent register, and as to the transfer-connections of the temporary and permanent registers, which will be fully explained.

The wheels or disks B B′ B″ are each provided on their upper faces, around the edge, at equal distances apart, with the numerals 0 to 9, inclusive, as usual, and said wheels are carried each by its respective hub or sleeve C C′ C″, which hubs are free to turn upon and around their respective stud axles or arbors D D′ D″, fixed at their inner ends to the base of the machine, as clearly shown in Fig. 6.

The hub or sleeve C of the units-wheel B of the temporary register has fixed upon it, near its lower end, a ratchet-wheel, *b*, and above said ratchet-wheel *b* a toothed spur-wheel, *b′*, while upon said hub, above said spur-wheel, is also fixed a one-toothed plate, *b″*, the wheel or disk B being mounted upon the hub or sleeve just above said one-toothed wheel.

Below the ratchet-wheel *b* of the sleeve C is mounted a ratchet-wheel, E, which is free to turn around a reduced portion of said hub or sleeve C, as clearly shown in Fig. 6. These two ratchet-wheels *b* and E constitute the actuating ratchet-wheels of the register, each of said wheels being provided with ten teeth in its edge or periphery, corresponding to the graduations or numerals of the unit disk or wheel B, the ratchel-wheel *b* being the actuating-wheel of the temporary register, while the wheel E serves to trip the bell-hammer (to be hereinafter described) to sound an alarm simultaneously with the actuation of the register.

The said wheels *b* and E are actuated to move the register and sound the alarm by means of a pivoted pawl, *f*, in this instance, which is mounted upon a vibrating lever, actuator, handle, or prime mover, F, the outer end of said lever projecting through a recess or opening formed in the casing at one end, for the purpose of actuating the machine, while the inner end of said lever is connected with the base-plate of the machine by a pivot, which permits it to vibrate. The lever is limited in its range of movement by the shoulders formed at the end of the slot in the casing, through which said lever projects. (See Fig. 2.)

The actuating-pawl *f* is provided with a stop-pin or lug, *f′*, which prevents it from being thrown out of position by the action of its spring *f″*, which holds the pawl to its work. (See Figs. 2 and 5.)

The alarm apparatus consists of a bell, G, secured to the base-plate at the end of the machine opposite that from which the actuator-lever projects, and of a bell-hammer, H, the arm or lever of said hammer being pivoted at one end to the base-plate of the machine, and provided with a projection or tooth, *h*, which engages the teeth of the actuating ratchet-wheel E, so as to trip the hammer and sound the alarm as the ratchet-wheel E is turned in the process of counting by the actuating-pawl *f*, the hammer being raised by each tooth of the said wheel E as it is revolved, and as the tooth *h* drops into the notch immediately following a receding tooth, sounding the alarm, the projection of the hammer-lever being forced suddenly into the notches of the wheel by a spring, H′, under tension, as is common in registering apparatus.

A spring, F′, coiled around the post rising from the base-plate of the casing upon which the bell is mounted, has one end secured to said base-plate, while the other end is connected with the lever so as to maintain it in a normal position with its actuating-pawl out of contact with the wheels *b* E, the said spring also, when the lever is vibrated to actuate the wheels *b* and E, automatically throwing the lever away from said wheels when the actuating force upon the lever is removed.

At each actuation of the lever F the pawl *f* engages a tooth of each of the wheels *b* and E, turning them one point, or the distance of one tooth, which consequently also turns the wheel or dial B the distance of one point or one-tenth of a revolution, which, if the register has been started at zero, causes the numeral 1 to appear opposite an opening or window in the face-plate of the machine, there being in this instance an independent window or opening, *a a′ a″*, for each of the registering-wheels B B′ B″, as clearly shown in Fig. 1, while there is a similar opening for each of the wheels of the permanent or receiving register train above the windows of the temporary register.

Each actuation of the lever F and register is also accompanied by the sounding of the alarm.

At the tenth actuation of the lever, which completes an entire revolution of the units-wheel B and brings the figure 0 beneath the window of the units-wheel, the tooth *b‴* of the one-tooth wheel *b″* engages one of the ten notches formed in a plate, *c*, fixed to the hub C′ of the tens-disk B′, beneath said tens-disk, and turns that wheel or disk one point or one-tenth of a revolution, carrying its numeral 1 beneath the window of the tens-wheel, whereby the temporary register indicates a tally or record of 10, while at a complete revolution of the tens-disk the hundreds-wheel of disk B″ is moved one point or one-tenth of a revolution by a tooth projecting from a plate, *d*, fixed to the hub of the tens-disk B′ similarly to the one-toothed plate *b″* of the units-disk, said tooth engaging one of the series of notches cut in a plate, *e*, fixed to the hub C″ of said hundreds-disk B″ similarly to the plate *c* fixed to the tens-disk hub.

As there is no additional wheel or disk to be turned to indicate thousands in the temporary register, as such is not considered essential, the hub of the hundreds wheel or disk has no toothed actuating-plate; and in order to prevent the possibility of adding, tallying, or registering until the capacity of the temporary register is exhausted, which would result in the register commencing at zero again, and perhaps a loss of the record or count made by it if no means were provided to guard against such loss, we have constructed the actuating notched wheel *e* of the hundreds-wheel with only a partial set of notches, (two being omitted in the example shown,) so that the tooth of the wheel *d* carried by the tens-disk hub cannot engage the wheel *e* to complete a full revolution of the hundreds wheel or disk, as clearly shown in Figs. 2 and 3.

In order to prevent the ratchet-wheels *b* and E from being moved farther than they should go at each actuation of the actuating-lever, (which is the distance of one tooth or one-tenth of a revolution,) we provide the actuating-lever with a projection or stop, *f‴*, as shown in Figs. 2, 3, 4 and 5, which, at the moment the said wheels *b* and E have traveled the distance of one tooth, comes into contact with the periphery of the wheels or with the teeth thereof, being broad enough to act on both, and positively holds the wheels from further movement.

Furthermore, in order to prevent the sounding of the alarm without actuating the register, and thereby to prevent fraudulent ringing of the bell without operating the register we provide a notch, *e′*, in the back of each tooth of the ratchet-wheel E, with which the projection *h* of the bell-hammer lever engages, which notches serve as a catch to hold the bell-hammer lever and prevent the hammer from striking the bell in case the actuating-lever is permitted to return to its normal position of rest after having been moved only a part of its stroke. The notches are intended to be formed near the roots of the teeth of the ratchet-wheel, so that if the lever F is not moved a sufficient distance to raise the projection *h* of the bell-hammer lever over the notch, then the recoil will not have sufficient force to vibrate the bell-hammer lever enough to sound the alarm.

Instead of the ratchet-wheel E having the notches or fine teeth cut in the back of its actuating teeth, there may be substituted a ratchet-wheel with fine teeth secured to said actuating-wheel, and a pawl made to fall into the fine teeth as the wheel revolves to prevent back movement.

During the back stroke of the actuating-lever, caused by the accumulated force or tension of the returning-spring F′, the actuating-pawl *f* will ride over the teeth of the bell-hammer actuating-wheel E, which is prevented from back movement by the projection or tooth *h* of the bell-hammer lever, the said tooth *h* engaging either the shallow or secondary teeth formed in the said wheel or with its actuating-teeth, which are acted upon by the actuating-pawl of the lever F. Thus it will be seen that the teeth of the ratchet-wheel E become guides to the pawl to ride upon in its backward movement, and prevent said pawl from dragging over the teeth of the ratchet-wheel *b*, which wheel might be turned backward were it not for this shield or projection.

The permanent or receiving register consists, in the present instance, of four wheels, I I′ I″ I‴, registering, respectively, units, tens, hundreds, and thousands. Except the construction and operation of the units-wheel I and the method of operating it in transferring the record of the temporary register, we deem it unnecessary to dilate upon the construction of the permanent register, it being sufficient to say that each wheel is provided with the numerals 0 to 9, inclusive, as usual, and that at each complete revolution of one wheel the next highest counting-wheel is turned one-tenth of a revolution, the registering-wheels, as before stated, operating upon the principle of the well-known "Geneva stop" wheel. The said units-wheel I is mounted upon the upper end of a hub or sleeve, J, turning around a fixed pin or stud axle, K, rising from the machine. (See Fig. 6.) Fixed to said hub J, near its lower end, is a ten-toothed ratchet-wheel, *i*, with the teeth of which a pawl, *i′*, pivoted to the base of the machine, engages to prevent back movement of the units-disk I, and consequently of the rest of the permanent-registering train. Above said ratchet-wheel *i* is mounted a spur-wheel, *j*, fitted so as to turn loosely and freely around a reduced portion of the hub or sleeve J. Said spur-wheel *j* meshes with the teeth of the spur-wheel $b'$ fixed upon the hub C of the units-wheel B of the temporary register, as clearly shown in Figs. 2 and 6. This spur-wheel $j$ is provided upon its upper surface with a pivoted pawl, $j'$, and said pawl engages, when the spur-wheel $j$ is turned in one direction, with the teeth of a ratchet-wheel, $k$, (fixed to the hub J intermediate of the spur-wheel $j$ and the units disk or wheel I,) to actuate the permanent register, while if said spur-wheel be turned in the other direction the pawl $j'$ slips over the teeth of the ratchet-wheel $k$, leaving the permanent register unaffected, back movement being prevented by the stop-pawl $i'$, as before mentioned.

The organization of the two registering mechanisms is such that when the units-wheel B of the temporary register is actuated in the process of counting or tallying the revolution of the spur-wheel $b'$ will turn the spur-wheel $j$ of the permanent register in a direction which permits its pawl $j'$ to slip over the actuating ratchet-wheel $k$ of the permanent register without affecting the indication or count of said register, while if the temporary register be turned in the opposite direction, reset, or turned back to zero, or to any desired extent, the revolution of the spur-wheel $b'$ will cause the spur-wheel $j$ to turn in a direction to engage the pawl $j'$ with the teeth of the ratchet-wheel $k$ on the hub J of the units-wheel I and actuate the permanent register to the extent of the resetting movement of the temporary register, both the spur-wheels $b'$ and $j$ being of the same diameter, and having the same number of teeth, and consequently making the same number of revolutions in the same time.

The temporary register cannot be reset beyond zero, owing to the omission of some of the notches in the notched wheel $e$ of the hundreds-wheel B″, before described.

It will be obvious that an entire transfer of the record or count of the temporary register may be made to the permanent register at each complete resetting movement of said temporary register; or, if desirable, a partial transfer only may be made.

In order to reset the temporary register when desired, and transfer its record to the permanent register without liability of the temporary register being moved in the counting direction by the resetting mechanism, we mount a spur-wheel, L, loosely upon a tubular sleeve or shaft, M, capable of turning freely upon a stud, shaft, or pin fixed to and projecting from the base-plate of the machine, said spur-wheel L meshing with the spur-wheel $j$, and being provided with a pivoted or yielding pawl, $l$, to engage the teeth of a ratchet-wheel, $m$, fixed to the said tubular shaft M above the said spur-wheel L.

The upper end of the tubular shaft M is squared for the reception of a suitable removable key or wrench, which is passed through a suitable opening or key-hole in the face-plate of the casing.

The resetting-key may be applied and turned so as to carry the shaft and its ratchet-wheel $m$ in a direction to permit the pawl $l$ of the spur-wheel L to ride over the teeth of said ratchet-wheel without moving the spur-wheel L or affecting the count or record of the register in any way, as will be obvious, while if the movement be reversed or the shaft turned in the opposite direction a tooth of the ratchet-wheel $m$, by means of engagement with the pawl $l$, turns the spur-wheel L positively with the shaft M, and, by reason of the meshing of said wheel L with the spur-wheel $j$, turns the ratchet-wheel $k$, and consequently the units-wheel I of the permanent register, in its counting direction. Said spur-wheel $j$, by reason of meshing with the spur-wheel $b'$ of the units-disk of the temporary register, turns said register backward, resetting it to the whole or any desired extent, as before explained, and transferring its record or count to the permanent register during the resetting movement.

During the counting actuations of the temporary register by the prime mover or actuating-lever, it will, of course, be understood that the spur-wheels $j$ and L turn loosely without affecting the count or tally of the machine.

The spur-wheels of the respective registering mechanisms may be connected through an intermediate gear, instead of by a direct mesh of the wheels, if desired.

What we claim as our invention is—

1. The combination, substantially as hereinbefore set forth, of two registering mechanisms, one only of which is actuated consecutively in the process of counting, and is capable of being reset or adjusted, while the other of said registering mechanisms has transferred to it, (or there is made to appear upon it,) during the resetting movements of the adjustable register, a count or tally corresponding to that lost or displaced by the resetting movement of said adjustable register.

2. The combination, substantially as hereinbefore set forth, of two registering mechanisms, one only of which is actuated consecutively in the process of counting, and is capable of being reset, while the other of said registering mechanisms has transferred to it (or there is made to appear upon it) a count or tally corresponding to that which is lost or displaced by the resetting movement of said adjustable register, with an alarm which is sounded for each consecutive actuation of the adjustable register in the process of counting or tallying.

3. The combination, substantially as hereinbefore set forth, of the temporary and permanent registering mechanisms, geared together, the said temporary register being operated consecutively in the counting process without affecting the count or record of the permanent register, and capable of being reset, while the permanent register, during the resetting movements of the temporary register, has transferred to it a record or count corresponding to that lost or displaced by the resetting movements of the temporary registering mechanism.

4. The combination, substantially as hereinbefore set forth, of the temporary and receiving or permanent registers, the spur or gear wheels of said registers, and the resetting and transfer spur-wheel mounted upon the turning-shaft to which the key is applied.

5. The combination, substantially as hereinbefore set forth, of the temporary and permanent registers, the prime mover or actuator, which actuates the temporary register only in the process of counting, mechanism to reset said temporary register and cause its record to be transferred or to appear upon the permanent register, and an alarm which is sounded for each actuation of the temporary register during the counting actuations.

In testimony whereof we have hereunto set our hands this 15th day of January, A. D. 1880.

JOSEPH BENNOR.
PHILANDER POND.

Witnesses as to Bennor:
A. L. HENNERSHOTS,
DE FORREST BALLOU.

Witnesses as to Pond:
WM. S. BEAMAN,
JOHN B. BENTON.